May 7, 1968     C. F. KODEY     3,381,606
COOKING DEVICE
Filed June 23, 1966
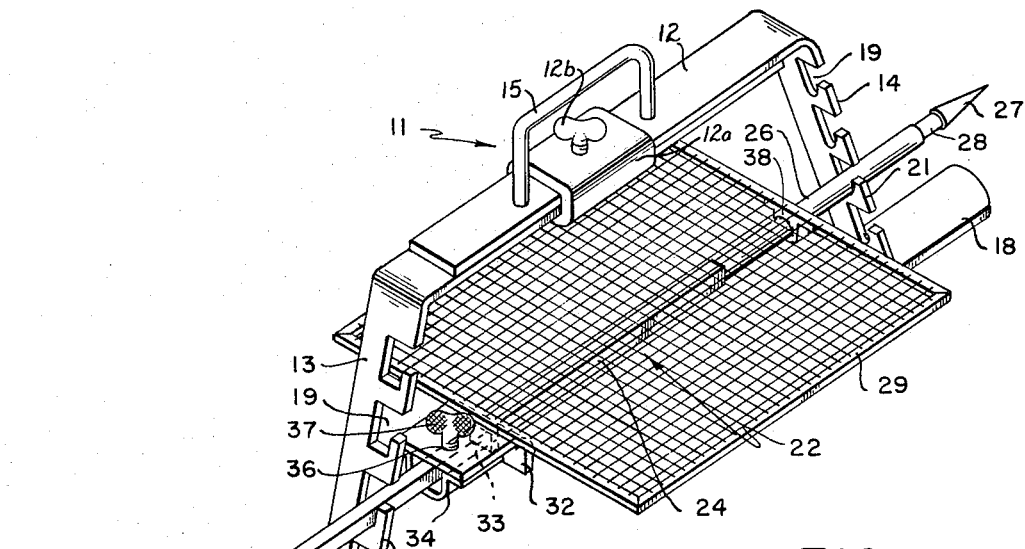
FIG. 1.
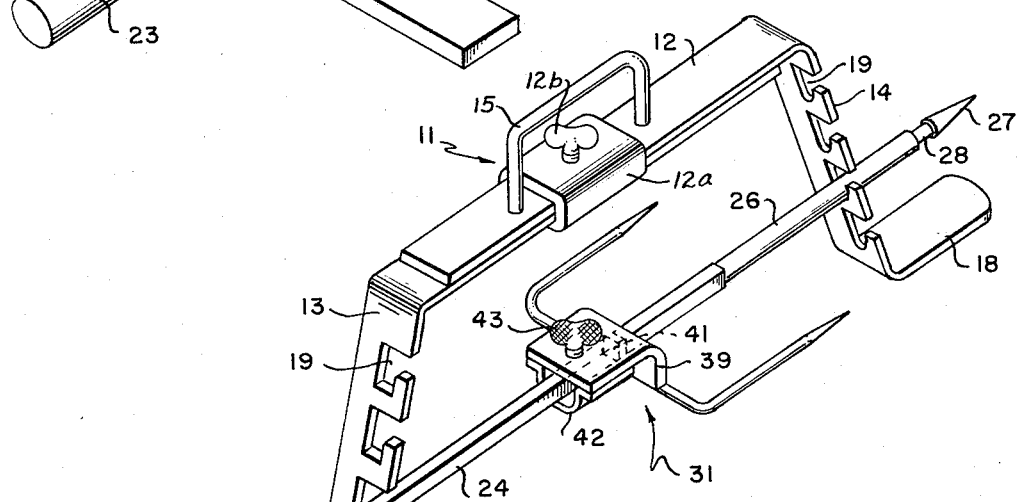
FIG. 2.
INVENTOR
CYRIL F. KODEY
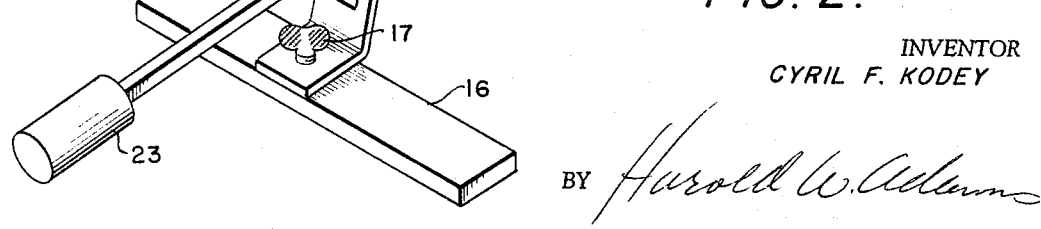
BY
ATTORNEY United States Patent Office 3,381,606
Patented May 7, 1968

3,381,606
COOKING DEVICE
Cyril F. Kodey, 1636 Chestnut St.,
South Plainfield, N.J. 07060
Filed June 23, 1966, Ser. No. 559,990
7 Claims. (Cl. 99—421)

ABSTRACT OF THE DISCLOSURE

A portable cooking device for use over an open fire including a unitary self supporting frame and an adjustable spit.

---

This invention relates to a cooking device and more particularly to a portable grill that may be used indoors or outdoors.

An object of this invention is to provide a portable cooking device that may be used for cooking directly over a fire either indoors or outdoors.

Another object of this invention is to provide a portable cooking device for cooking over a fire that permits ready adjustment of the food to be cooked on the grill relative to the fire permitting the control and regulation of the cooking temperature.

Yet another object of this invention is to provide a portable and adjustable cooking device that may be used for cooking on a spit or a grill and that permits turning as well as vertical adjustment relative to the fire.

These and many other objects may be achieved with this invention which in general comprises a frame for supporting a spit over an open fire. The frame is provided with a plurality of vertically spaced notches at either end that cooperate with the configuration of the spit permitting vertical as well as horizontal and rotary adjustment of the spit relative to the frame and fire. A support bracket for a fork and grill are provided with attachment means also cooperative with the configuration of the spit permitting the fork and grill to be readily attached and removed from the spit. As the frame and attachments extend over the fire, fat and juices from the food being cooked fall into the fire without sticking on the frame so the device may be easily cleaned.

These and many other objects and advantages will become apparent from the following description of a preferred embodiment of the invention when read in view of the appended drawing wherein:

FIGURE 1 is a perspective view of the invention when used with a grill; and

FIGURE 2 is a perspective view of the invention when used with a fork.

Referring now to FIGURE 1 a preferred embodiment of the invention generally comprises a frame designated by the numeral 11 having a body portion 12 and angularly extending legs 13 and 14 of sufficient length to support the body portion 12 at the desired height over a fire. The frame 11 may be formed of a single piece of angle iron with the end portions 13 and 14 bent at an angle from the body portion 12. The length of the body portion 12 is of sufficient length so that it extends over the fire and may be made adjustable by cutting it at the midpoint so that the respective and opposing end portions are horizontally adjustable one over the other in a sliding, telescoping fashion within a collar or ring 12A that may be clamped on to the frame by means of wing nut 12B to hold the body members together. The legs 13 and 14 may be bent at the same angle so as to extend parallel from the body member 12. An insulating handle 15 may also be provided. A foot 16 that extends transverse to the frame 11 is secured to a flat angularly extending end 17 formed on the leg 13 as by welding or suitable fasteners so that it may be removed for storage while the end 18 of leg 14 is formed similarly to end 17 to provide a flat support. This structure provides an easily positioned "over the fire" supporting frame.

Both legs 13 and 14 are provided with a plurality of evenly and vertically spaced and rectangularly shaped interior notches 19 with a rectangular opening on an edge 21 of the legs 13 and 14 which receive a metal spit designated by the reference numeral 22 that extends between the legs 13 and 14 and on one end of which is secured a heat insulating handle 23 of wood, plastic or the like. The bottoms of notches 19 in leg 14 may be rounded permitting free rotation of a spit as will become apparent. A portion 24 of the spit 22 is square in shape being slightly smaller in size than the rectangular notches 19 in the leg 13 so that it may be readily received therein. The opening of the notches 19 is large enough to permit rotation of the spit within the opening without removal from the leg. An end portion 26 of the spit 22 is cylindrical and of small enough diameter to be received within the notches 19 formed in leg 14. The square and cylindrical portions of the spit may be arranged to telescope one within the other permitting the length of the spit to be adjusted. The end 27 is pointed to permit ready insertion through meat, or other foodstuff to be cooked and a groove 28 cooperates with notches 19 to prevent accidental withdrawal of spit 22 horizontal through leg 14 and thus loose the support of leg 14.

Referring now to FIGURES 1 and 2 the spit 22 may receive a conventional wire grill 29 or one or more spits designated generally by reference numeral 31 for supporting meat or other food. The grill 29 may be of conventional design and manufacture and at one end is fitted as by welding on the underside adjacent an edge a support bracket comprising a piece of angle iron 32 provided with an aperture 33 for receiving the square portion 24 of the spit 22. A U shaped member 34 is spot welded to the underside of the angle iron 32 through which the spit 22 also passes. A tapped hole 36 in the angle iron 32 receives a threaded wing nut 37 which when tightened down firmly secures the support bracket and grill 29 in place on the spit 22. At the opposite end a U shaped member 38 is secured to the underside of the grill and receives the cylindrical end 26 of the spit 22 thus permitting the support bracket and grill 29 to be readily attached to the spit.

The fork or spike 31 provides tines for supporting roasts, fowl, etc. on the spit and may be formed of metal such as stainless steel for easy cleaning. The fork is also secured to a support bracket similar to that supporting the grill. An edge of a short piece of angle iron 39 is secured to the back of the fork 31 as by welding. The angle iron extends upwardly from the fork and includes a square aperture 41 in its vertical flange for receiving the square portion 24 of the spit 22. A U shaped member 42 is welded to the underside of the horizontally extending flange of the angle iron 39 and wing nut 43 threadably received in the angle iron 39 is provided for rigidly securing the fork to the spit. If desired two similar opposing forks may be secured to the spit by providing either a rectangular or circular aperture in the angle iron.

From the foregoing it is seen that this portable cooking device permits ready vertical adjustment of the spit relative to a cooking fire by placing the spit in the desired notches 19 in the legs 13 and 14. If it is desired to rotate the spit for even cooking the spit is rotated 90°, the square portion 24 of the spit cooperates with the similar shaped notches to support the spit in the adjusted position. By using the support brackets, the grill and forks are interchangeable on the spit so the device may be used for cooking a variety of different shapes and sizes of meat, sandwiches, and the like. As the frame 11 extends over the cooking fire the device may be used indoors in fire places or outdoors over an open fire. All juices, and fats from the food fall directly into the fire without touching the frame so the device is free of fat and grease and may be easily cleaned. The frame may be of varying size but yet stable and compact and is economically fabricated of angle iron.

Although a preferred embodiment of the invention has been described in detail, numerous changes and modifications may be made within the principles of the invention which is to be limited only by the scope of the appended claims.

What is claimed is:

1. A portable device for cooking over a fire comprising: a frame including a horizontally extending body portion and angularly extending legs integrally formed thereon; a foot secured to one leg and extending transversely of said body portion; a spit including a portion square in cross section and a portion circular in cross section; and a plurality of vertically spaced and open notches formed in said legs, an equal number of notches being formed in each leg and the notches in one leg being square in configuration for receiving said square portion of said spit whereby said spit may be adjustably supported by said frame in said notches.

2. A device as defined in claim 1 wherein said body portion of said frame is adjustable in length.

3. A device as defined in claim 1 wherein said foot is detachably secured to said leg.

4. A device as defined in claim 1 including a support bracket having an aperture therein for receiving said spit and means for securing said support bracket to said spit.

5. A device as defined in claim 4 wherein said support bracket comprises: an angle iron having an aperture in a first vertical flange for receiving said spit; a U shaped member secured to the underside of a horizontal flange of said angle iron for receiving said spit; and means for securing said angle iron to said spit.

6. A device as defined in claim 5 including a grill secured to said support bracket.

7. A device as defined in claim 5 including a fork secured to said supporting bracket.

References Cited

UNITED STATES PATENTS

| | | |
|---|---|---|
| 1,552,856 | 9/1925 | Judge. |
| 1,888,616 | 11/1932 | Bocchino _____ 99—421 |
| 2,058,172 | 10/1936 | Myers _____ 126—29 X |
| 2,122,780 | 7/1938 | Peyton _____ 99—421 |
| 2,600,234 | 6/1952 | Foley _____ 99—421 |

FOREIGN PATENTS 840,856    1/1939    France.

OTHER REFERENCES

Roto-Broil Corp. of America, "New Improved Interchangeable Spit," October 1956.

WALTER A. SCHEEL, *Primary Examiner.*

IRVING BUNEVICH, *Examiner.*

JOHN M. NEARY, *Assistant Examiner.*